(12) United States Patent
Borremans et al.

(10) Patent No.: US 9,233,363 B2
(45) Date of Patent: Jan. 12, 2016

(54) CATALYST PREPARATION REACTORS FROM CATALYST PRECURSOR USED FOR FEEDING REACTORS TO UPGRADE HEAVY HYDROCARBONACEOUS FEEDSTOCKS

(75) Inventors: Didier Borremans, Boussu (BE); Maxime Lacroix, Uccle (BE); Katell Le Lannic-Dromard, Le Havre (FR); Gloria Vendrell, Le Havre (FR)

(73) Assignee: TOTAL MARKETING SERVICES, Puteaux (FR)

( * ) Notice: Subject to any disclaimer, the term of this patent is extended or adjusted under 35 U.S.C. 154(b) by 383 days.

(21) Appl. No.: 13/808,469

(22) PCT Filed: Jul. 5, 2011

(86) PCT No.: PCT/EP2011/061284
§ 371 (c)(1),
(2), (4) Date: Mar. 22, 2013

(87) PCT Pub. No.: WO2012/004246
PCT Pub. Date: Jan. 12, 2012

(65) Prior Publication Data
US 2013/0193035 A1 Aug. 1, 2013

(30) Foreign Application Priority Data
Jul. 6, 2010 (EP) .................... 10305744

(51) Int. Cl.
*B01J 31/22* (2006.01)
*C10G 49/00* (2006.01)
(Continued)

(52) U.S. Cl.
CPC .......... *B01J 31/2295* (2013.01); *B01J 31/2208* (2013.01); *C10G 49/00* (2013.01);
(Continued)

(58) Field of Classification Search
CPC ............ B01J 31/00; B01J 31/02; B01J 31/12; B01J 31/122; B01J 31/16; B01J 31/22; B01J 31/2282; B01J 31/2291; B01J 31/2295; B01J 35/00; B01J 35/0013; B01J 35/12
See application file for complete search history.

(56) References Cited

U.S. PATENT DOCUMENTS 4,430,442 A 2/1984 Sawyer et al.
4,592,827 A 6/1986 Galiasso et al.
(Continued)

FOREIGN PATENT DOCUMENTS

CN 1373008 A 10/2002
JP 56-065636 A 6/1981
(Continued)

OTHER PUBLICATIONS

International Search Report [PCT/ISA/210] for PCT/EP2011/061284, dated Feb. 17, 2012.
(Continued)

*Primary Examiner* — Brian McCaig
(74) *Attorney, Agent, or Firm* — Sughrue Mion, PLLC

(57) ABSTRACT

A process for upgrading heavy hydrocarbonaceous feedstocks in at least one hydroconversion reactor for hydroconversion of the heavy hydrocarbonaceous feedstocks and in at least one hydrotreatment reactor for hydrotreatment of the heavy hydrocarbonaceous feedstocks, comprising the preparation of two or more catalysts, each catalyst being prepared from one or more catalyst precursor in at least one specific preparation reactor, the catalyst precursor containing at least one transition metal selected from group IIA, IIIB, IVB, VB, VIB, VIIB, VIII, IB or IIB of the periodic table of elements, and each preparation reactor feeding one or more hydroconversion or hydrotreatment reactor, each catalyst contained in preparation reactors being dedicated to hydroconversion or hydrotreatment of the feedstocks.

20 Claims, 3 Drawing Sheets

(51) Int. Cl.
*C10G 49/04* (2006.01)
*C10G 49/12* (2006.01)
*C10G 65/02* (2006.01)
*C10G 65/12* (2006.01)
*B01J 31/16* (2006.01)
*B01J 35/00* (2006.01)

(52) U.S. Cl.
CPC ............... *C10G 49/04* (2013.01); *C10G 49/12* (2013.01); *C10G 65/02* (2013.01); *C10G 65/12* (2013.01); *B01J 2231/645* (2013.01); *B01J 2231/646* (2013.01); *B01J 2531/56* (2013.01); *B01J 2531/64* (2013.01); *B01J 2531/842* (2013.01); *C10G 2300/107* (2013.01); *C10G 2300/1011* (2013.01); *C10G 2300/1077* (2013.01); *C10G 2300/703* (2013.01); *C10G 2300/708* (2013.01)

(56) References Cited

U.S. PATENT DOCUMENTS

| | | | |
|---|---|---|---|
| 4,770,764 A | 9/1988 | Ohtake et al. | |
| 4,824,821 A | 4/1989 | Lopez et al. | |
| 4,839,326 A | 6/1989 | Halbert et al. | |
| 5,372,705 A * | 12/1994 | Bhattacharya et al. | 208/112 |
| 5,578,197 A | 11/1996 | Cyr et al. | |
| 5,620,591 A * | 4/1997 | Poole et al. | 208/112 |
| 2006/0058175 A1 | 3/2006 | Chen et al. | |
| 2009/0107881 A1 | 4/2009 | Lott et al. | |
| 2011/0017635 A1 * | 1/2011 | Chabot et al. | 208/59 |

FOREIGN PATENT DOCUMENTS

| | | |
|---|---|---|
| JP | 59-172587 A | 9/1984 |
| JP | 07-090282 A | 4/1995 |
| JP | 2007-535604 A | 12/2007 |
| WO | 2005/104752 A2 | 11/2005 |
| WO | 2007/082117 A2 | 7/2007 |

OTHER PUBLICATIONS

Wolfrum et al., "Einfluβ Eisen-und Schwefelhaltiger Katalysatoren auf die Hydrierende Verflüssigung von Braunkohle," Comm. Eur. Communities, pp. 63-84.

Oelert et al., "Laborversuche zum Einfluss von Katalystor, Wassergehalt and Reaktions-Gasangebot bei der Hydrierenden Kohleverflossingung," Comm. Eur. Communities, pp. 107-115 (1984).

Communication (Patent Examination Report No. 1) dated May 6, 2015, issued by IP Australia in corresponding Australian Patent Application No. 2011275813.

Communication (Notification of Reasons for Refusal) dated Jun. 23, 2015, issued by the Japanese Patent Office in corresponding Japanese Patent Application No. 2013-517353.

* cited by examiner

CATALYST PREPARATION REACTORS FROM CATALYST PRECURSOR USED FOR FEEDING REACTORS TO UPGRADE HEAVY HYDROCARBONACEOUS FEEDSTOCKS

CROSS REFERENCE TO RELATED APPLICATIONS

This application is a National Stage of International Application No. PCT/EP 2011/061284 filed Jul. 5, 2011 claiming priority based on European Patent Application No. 10 305 744.4 filed Jul. 6, 2010.

The invention concerns a process for upgrading heavy hydrocarbonaceous feedstocks, and particularly the catalysts feeding of the reactors used in the process.

As the price or shortage of crude oil increases, there is an increasing demand to find ways to better exploit these lower quality feedstocks and extract fuel values there from.

Methods known to improve upgrading of hydrocarbonaceous feedstocks use particular operating conditions (T°, P°, H2, ... ).

However, there is still a need for improved process for upgrading hydrocarbonaceous feedstocks.

A first object of the invention concerns a process for upgrading heavy hydrocarbonaceous feedstocks in at least one hydroconversion reactor for hydroconversion of said heavy hydrocarbonaceous feedstocks and in at least one hydrotreatment reactor for hydrotreatment of said heavy hydrocarbonaceous feedstocks, said process comprising the preparation of two or more catalysts, each catalyst being prepared from one or more catalyst precursor in at least one specific preparation reactor, said catalyst precursor containing at least one transition metal selected from group IIA, IIIB, IVB, VB, VIB, VIIB, VIII, IB or IIB of the periodic table of elements, and each preparation reactor feeding one or more hydroconversion or hydrotreatment reactor, each catalyst contained in preparation reactors being dedicated to hydroconversion or hydrotreatment of said feedstocks.

Such a process permits to obtain, under continuous operating conditions, products of better quality.

Preparation reactors dedicated to catalytic precursor activation allow more flexibility. Thus, advantageously, continuous feed to a reactor of the reaction section can be achieved and, what is more, the catalyst preparation reactors can feed different catalytic systems to the hydroconversion reactor and to the hydrotreatment reactor.

By hydroconversion is meant the breakage of bonds in the molecules of hydrocarbons under hydrogen atmosphere in order to decrease or suppress coke and gas (C1-C4) formation. The breakage of bonds itself is mainly driven by temperature, the catalyst being used to promote hydrogen incorporation into the products. The term hydroconversion is used to differentiate from "hydrocracking" where the breakage of bonds is promoted by the catalyst.

Catalysts for hydroconversion processes are based on metals from Group IIA, IIIB, IVB, VB, VIB, VIIB, VIII, IB and IIB.

By hydrotreatment is meant the removal of contaminants like sulfur, nitrogen, oxygen, metals, CCR (Conradson Carbon Residue), ..., from a hydrocarbon stream under hydrogen atmosphere. Catalysts for hydrotreatment are the same as for hydroconversion, however with a preference, thanks to their higher activity, for metals of groups VB and VIB promoted or not with metals from group VIII.

Hydroconversion will preferably be performed before hydrotreatment, although hydrotreatment may precede hydroconversion.

Advantageously, each preparation reactor may be fed with a part of the feedstock to treat. Eventually, a liquid hydrocarbon may be fed to the preparation reactor for obtaining a less viscous mixture, in addition to the feedstock to treat or in replacement of this feedstock.

Preparation reactors may also be fed with a sulfiding agent for activating the catalyst precursor. Sulfiding agent may be for example DMSO (dimethylsulfoxide), DMDS (dimethyldisulfide), elemental sulfur or $H_2S$, pure or in mixtures coming from refinery sources, or any appropriate sulfur containing compound. Depending on the composition of the feedstock added to the catalyst precursor in the preparation reactor, such addition of sulfiding agent may be avoided: sulfidation of the catalyst precursor is then performed by the sulfur contained in the feedstock.

Catalytic precursor activation (conversion of precursor to active sulfur specie of the metal contained in the precursor) may be achieved in dedicated vessels.

The mixture is heated under programmable operating conditions (temperature, pressure, concentration of sulfidation agent, residence time).

In order to improve additive dispersion and to limit foaming, crushed solids or other additives (dispersing agents ...) can be added (example crushed coke, 2% wt, granulometry 300 to 500 microns; alumina; thiosilicates; sulfonates of calcium carbonate; as well as any other suitable additive as those described in U.S. Pat. No. 5,594,945).

Hydrogen may also be added to preparation reactors. Such addition helps to control activity of the very active sulfur specie of the activated catalyst such that coking of the catalyst is reduced or avoided.

Advantageously, each dedicated catalyst is prepared in at least two preparation reactors. The hydroconversion reactors or the hydrotreatment reactor can then be continuously fed with the catalyst.

Temperature and Pressure conditions for hydrotreatment and hydroconversion will advantageously be very similar or the same.

Reaction temperature for hydroconversion may range from 360° C. to 480° C., preferably from 400 to 440° C., under a pressure of 50 to 300 bars, preferably from 100 to 200 bars.

Reaction temperature for hydrotreatment may range from 360° C. to 480° C., preferably from 380 to 440° C., under a pressure of 50 to 300 bars, preferably from 100 to 200 bars.

Hydrotreatment and hydroconversion reactors can operate in upflow or downflow reactor. These reactors are preferably perfectly stirred reactors (CTSR).

Each reactor is fed with at least one slurry issued from a catalyst preparation reactor.

The slurry, consisting of feedstock containing activated catalyst, hydrogen and possibly other additives, and additional hydrogen if needed, is pressurized and enters the hydroconversion reactor and the hydrotreatment reactor.

Preferably, the slurry is preheated before pressurization.

Advantageously, catalyst(s) dedicated to hydroconversion contain one transition metal selected from group VB, VIB, VIII, in an active state, and catalyst(s) dedicated to Hydrotreatment contain two transition metals in an active state, one transition metal being selected from group VB, VIB, VIII and another transition metal being selected from group VIII.

Metals active for hydroconversion are preferably: Mo, Ni, Co, W, Cr, V, Fe.

Catalyst(s) dedicated to hydroconversion may contain V, Mo or Fe and catalyst(s) dedicated to hydrotreatment may contain the following combination: Mo—Ni, or Mo—V, or Fe—Ni.

Advantageously, catalyst(s) dedicated to hydroconversion contain from 20 ppm to 700 ppm of transition metal (weight ratio of transition metal to the feedstock), preferably from 250 to 650 ppm, most preferably from 300 to 600 ppm.

Advantageously, the whole content of transition metals in catalyst(s) dedicated to hydrotreatment ranges from 200 to 1000 ppm (weight ratio of transition metal to the feedstock), preferably from 250 to 900 ppm, most preferably from 300 to 500 ppm.

Different catalyst precursors may be used for each catalyst. Catalysts precursors may be selected from naphtenates, octoates, and oxides.

For example, precursors containing Mo will be naphtenates, precursors containing Ni will be octoate, such as 2-ethyl hexanoate, and precursors containing V will be acetylacetonate or acetoacetonate.

Alternatively, catalysts precursor of monometallic catalysts may also be an organometallic coordination compound of formula $C_1C_2ML_n$ (I), where M is a transition metal selected from group IIA, IIIB, IVB, VB, VIB, VIIB, VIII, IB or IIB of the periodic table of elements, —$C_1$ and —$C_2$ are monocyclic or polycyclic aryl hydrocarbon ligands that are pi-bonded to M, or monocyclic or polycyclic polyenes ligand pi-bonded to M, —$C_1$ and —$C_2$ being the same or different, each of —$C_1$ or —$C_2$ comprising from 0 to 5 substituents R, each substituent R being the same or different, R being selected from:

a C3-C8 substituted or unsubstituted, monocyclic or polycyclic ring structure that is partially unsaturated, unsaturated or aromatic, fused or not fused to the ligand —$C_1$ or —$C_2$, a C3-C8 substituted or unsubstituted, partially unsaturated or unsaturated, linear or branched, alicyclic hydrocarbyl radical, a C1-C8, substituted or unsubstituted, linear or branched, saturated hydrocarbyl radical, —$C_1$ and —$C_2$ being independent or connected via at least one substituent R, -L is a ligand that is sigma-bonded to M, n is an integer equal to 0 to 3, each -L is, independently, a univalent ligand.

A fused ring is a ring having two carbon atoms and one bond in common with another ring.

Advantageously, in formula $C_1C_2ML_n$, each of $C_1$ or $C_2$ is a $C_5$-$C_8$ monocyclic polyene ligand comprising from 0 to 5 substituents R, each substituent R being the same or different, R being defined as above.

Polyenes are poly-unsaturated organic compounds that contain one or more sequences of alternating double and single carbon-carbon bonds.

For example, each of $C_1$ or $C_2$ may be substituted or unsubstituted cyclopentadiene. The substituents may be the same as substituents R described above.

Advantageously, the organometallic coordination compound is a metallocene compound presenting the general formula (II) below

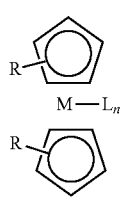
(II)

Where the R substituted or unsubstituted cyclopentadienyl ligands are pi-bonded to M, and L ligands are sigma-bonded to M, and where M, L, R and n are defined as in formula (I).

Thus, metallocene compounds consist of two cyclopentadienyl anions (substituted or not) bound to a metal center in a "sandwich" structure.

Advantageously, in the formulas (I) or (II), M is selected from Group IIA, IIB, IIIB, IVB, VB, VIB, VIIB or VIII of the periodic table of the elements, preferably M is selected from Fe, V or Mo.

Advantageously, in the formulas (I) or (II), the ligand -L is selected from:

Hydrides (-L=—H)
Halides (-L=—F, —Cl, —Br, —I)
"Pseudo-halides" (-L=—CN (cyanide))
Alkoxide (-L=—OR)
Thiolate (-L=—SR)
Amide (-L=—$NR_2$)
Phosphide (-L=—$PR_2$)
-L=-$ER_3$ or -$EX_3$ (with E=Si, Ge, Sn;)
Alkyl (-L=—$CH_2R$ or other)
Alkenyl (-L=—CHCHR)
Alkynyl (-L=—CCR)
Acyl (-L=—COR)
Isocyanide (-L=—CNR)
Nitrosyl (-L=—NO)
Diazenide (-L=—NNR)
Imide (-L=—NR)
-L=—$PR_3$, —$PX_3$, —$AsR_3$, —$SbR_3$ and amines
L=$ER_2$ (with E=O, S, Se, Te)

Where X is a halogen atom and R is a C1-C8, preferably a C1-C6, linear or branched, alkyl, alkenyl Group or a C3-C8 alicyclic or aromatic group.

The catalytic precursor is added under different concentration, depending on the type (octoate, naphtenate, metallocene, oxide . . . ) and under several forms: water soluble, oil soluble or finely powdered solid.

The oil-soluble metal precursors are available either as pure solids (metallocenes) or as solutions in hydrocarbons.

In the pure oil-soluble solid precursors, the metal content is known from the atomic weight of the metal and the molecular weight of the precursor molecule. The amount of precursor to add to the feedstock in order to obtain a given metal concentration in the feedstock can thus be calculated.

The solutions of oil-soluble precursors in hydrocarbons are analyzed on their metal content. The amount of solution to be added to the feedstock in order to obtain a given metal concentration in the feedstock can thus be calculated.

Process according to the invention may be used to upgrade carbonaceous feedstocks comprising an atomic H/C ratio of at least 0.25.

Thus, various feedstocks can be upgraded through this process: atmospheric and vacuum residues, pitch coming from deasphalting, deasphalted oil, visbroken effluents (thermal cracking), shale oils, biomass ex-pyrolysis and ex-hydrothermal treatment, coal and, at least theoretically, petcoke from delayed coker.

Other feedstocks can also be coprocessed together with petroleum residue: tires, polymers, road bitumen.

General characteristics of feedstocks mentioned above are given hereafter in tables 1 to 10 (the data on the feedstocks are indicative as the origin of the crude and the processing conditions may lead to substantial differences in their analyses).

For some feedstocks, results of a typical simulated distillation are given.

Such a simulated distillation method is performed as follows:

Hydrocarbons are introduced in the column of a gas chromatography column and are separated with the increasing ebullating point. Temperature column is increased. Ebullating points are deducted from a calibrating curve, obtained in the same operating conditions with a known hydrocarbon mixture.

The column used is a Simdis HT 750 from Analytical Controls; length=5 m; Film=0.09 μm; Internal Diameter=0.53 mm (AC partno.: 24001.065). As calibration mixture the following may be used:

1. A C5-C28 mixture from Analytical Controls (AC partno.: 59.50.101A),
2. A C30-C120 mixture from Analytical Controls (Ac partno.: 59.50.100B).

IP means Initial Point distillation: temperature corresponding to a curve area of 0.5% of total chromatogram area.

FP means Final Point distillation: temperature corresponding to a curve area of 99.5% of total chromatogram area.

TABLE 1a

Shale oil typical characteristics

| Characteristic | Value observed | Unit |
|---|---|---|
| gravity | 900-1076 | kg/m$^3$ |
| °API | 7.9-25 | |
| C | 78-86 | % wt |
| H | 7.5-12 | % wt |
| H/C | 1.2-1.7 | Atomic ratio |
| O | 0.7-7.5 | % wt |
| S | 0.5-7.5 | |
| N | 0.1-2.5 | % wt |
| Arsine | 5.6-50 | ppm |
| Antimony Sb | | |
| Olefins (Bromine number) | 20-1260 | gBr$_2$/100 g |

TABLE 1b

Shale oil typical Simulated Distillation
Example of typical Simulated Distillation:

| IP | 80° C. |
|---|---|
| 10% wt | 200° C. |
| 20% wt | 250° C. |
| 50% wt | 400° C. |
| 70% wt | 450° C. |
| 90% wt | 560° C. |

Shale oil are impurities rich, some impurities being catalysts poisons, such as Arsine (AsH$_3$). Arsine is the worst poison of hydroprocessing catalyst (NiMo, CoMo). Alternative processes for shale oil refining are hampered by the presence of arsine, which poisons their catalytic functions. During hydrotreatment, arsine is deposed on the catalyst and trapped as nickel arsenide.

In the described process, fresh catalyst is continuously added, so that catalyst poisoning does not impact their process performances or the effluent qualities.

TABLE 2a typical characteristics of Atmospheric and Vacuum residues

| Characteristic | Value observed | Unit |
|---|---|---|
| gravity | 995-1030 | kg/m$^3$ |
| °API | 10.7; 5.8 | |
| C | 82-85 | % wt |
| H | 9-14 | % wt |
| H/C | 1.3-2 | Atomic ratio |
| S | 0.3-4 | % wt |
| Ni | 1-94 | ppm |
| V | 5-448 | ppm |
| Asphaltenes C$_7$ (ASTM D6560) | 2-20 | % wt |

TABLE 2b typical simulated distillation of Atmospheric and Vacuum residues
Example of typical Simulated Distillation:

| IP | 433° C. |
|---|---|
| 10% wt | 544° C. |
| 20% wt | 576° C. |
| 50% wt | 636° C. |
| 70% wt | 688° C. |
| FP 88% wt | 748° C. |

TABLE 3a typical characteristics of Pitch

| Characteristic | Value observed | Unit |
|---|---|---|
| Deasphalting solvent | C$_3$ to C$_5$ | — |
| Gravity | 1.1-1.2 to solid | t/m$^3$ |
| Conradson Carbon | 50 | % wt |
| Sulfur | 6.5 | % wt |

TABLE 3b typical Simulated Distillation of Pitch
Example of typical Simulated Distillation:

| 1% wt | 222° C. |
|---|---|
| 10% wt | 310° C. |
| 30% wt | 590° C. |
| 50% wt | 682° C. |
| FP 57% wt | 740° C. |

TABLE 4a typical characteristics of Deasphalted oil

| Characteristic | Value observed | Unit |
|---|---|---|
| Deasphalting solvent | C$_3$ to C$_5$ | — |
| Gravity | 0.970-1.025 | t/m$^3$ |
| Conradson Carbon | 7-22 | % wt |
| Sulfur | 1-5 | % wt |
| Asphaltenes C$_7$ | <0.05-3 | % wt |

TABLE 4b typical Simulated Distillation of Deasphalted oil
Example of typical Simulated Distillation:

| | |
|---|---|
| IP | 371° C. |
| 10% wt | 513° C. |
| 20% wt | 543° C. |
| 50% wt | 603° C. |
| 70% wt | 643° C. |
| FP 95% wt | 741° C. |

TABLE 5a typical characteristics of Visbroken residue:

| Characteristic | Value observed | Unit |
|---|---|---|
| Gravity | 995-1080 | kg/m$^3$ |
| Conradson Carbon | 22-33 | % wt |

TABLE 5b typical Simulated Distillation of Visbroken residue:
Example of typical Simulated Distillation:

| | |
|---|---|
| IP | 384° C. |
| 10% wt | 496° C. |
| 20% wt | 536° C. |
| 50% wt | 613° C. |
| 70% wt | 680° C. |
| FP 82% wt | 748° C. |

TABLE 6 typical characteristics of Polymers:

| Elemental composition (dry basis) | Value observed | unit |
|---|---|---|
| C | 40-96 | % wt |
| H | 3-4 | % wt |
| H/C | 0.38-1.20 | Atomic ratio |
| O | 0-50 | % wt |

TABLE 7 typical characteristics of Petcoke:

| Elemental composition (dry basis) | Value observed | unit |
|---|---|---|
| C | 86-88 | % wt |
| H | 3-4 | % wt |
| H/C | 0.41-0.56 | Atomic ratio |
| N | 1 | % wt |
| S | 7.5 | % wt |
| Ni + V | 750 | ppm |

TABLE 8 typical characteristics of Pyrolysis Bio-oil

| Characteristic | Value observed | Unit |
|---|---|---|
| Moisture content | 15-30 | % wt |
| Elemental composition (dry basis): | | |
| C | 54-58 | % wt |
| H | 5-8 | % wt |
| H/C | 1.03-1.78 | Atomic ratio |
| N | 0-0.2 | % wt |
| O | 35-40 | % wt |
| Solids | 0.2-1 | % wt |

TABLE 9 typical characteristics of Slurry from pyrolysis bio-oil,
usually sent to gasification

| Characteristic | Value observed | Unit |
|---|---|---|
| Moisture content | 9-18 | % wt |
| Elemental composition (dry basis): | | |
| C | 72-75 | % wt |
| H | 3-5 | % wt |
| H/C | 0.48-0.83 | Atomic ratio |
| O | 20-25 | % wt |
| Coke particles | 40 | % wt |

TABLE 10 typical characteristics of Bio-oil ex hydrothermal conversion:

| Characteristic | Value observed | Unit |
|---|---|---|
| Moisture content | 9 | % wt |
| Elemental composition (dry basis): | | |
| C | 73.7 | % wt |
| H | 7.6 | % wt |
| H/C | 1.24 | Atomic ratio |
| O | 15.3 | % wt |
| N | 3.3 | % wt |

The following figure and example will illustrate the invention.

Figure 1:
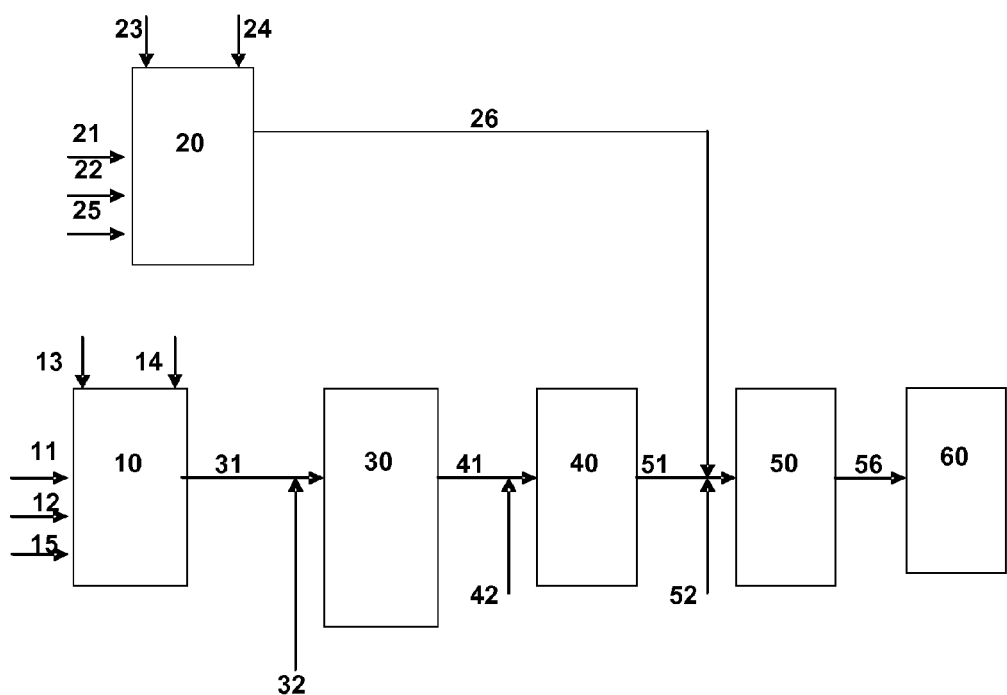
FIG. 1 represents schematically an embodiment of the process according to the invention.
Figure 2:
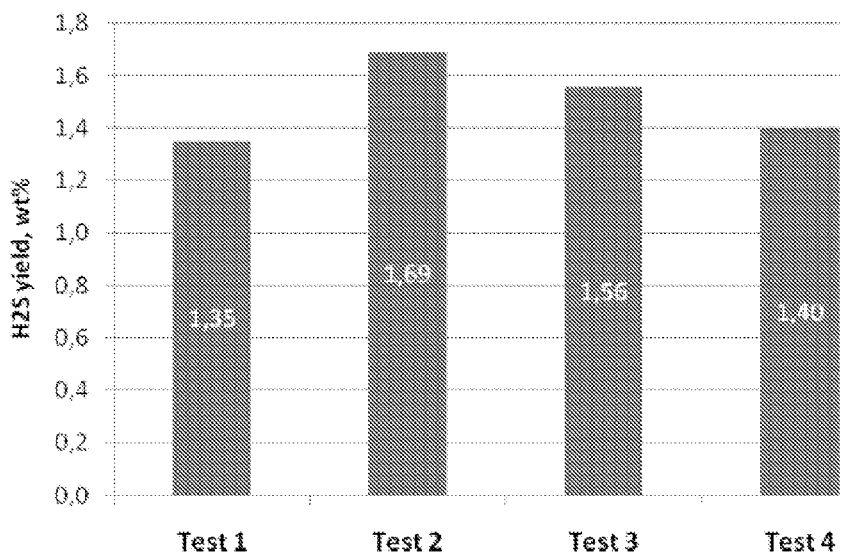
FIG. 2 represents H$_2$S yields (wt %) for the different tests of example 1 (reaction time: 1 h; temperature: 430° C.).
Figure 3:
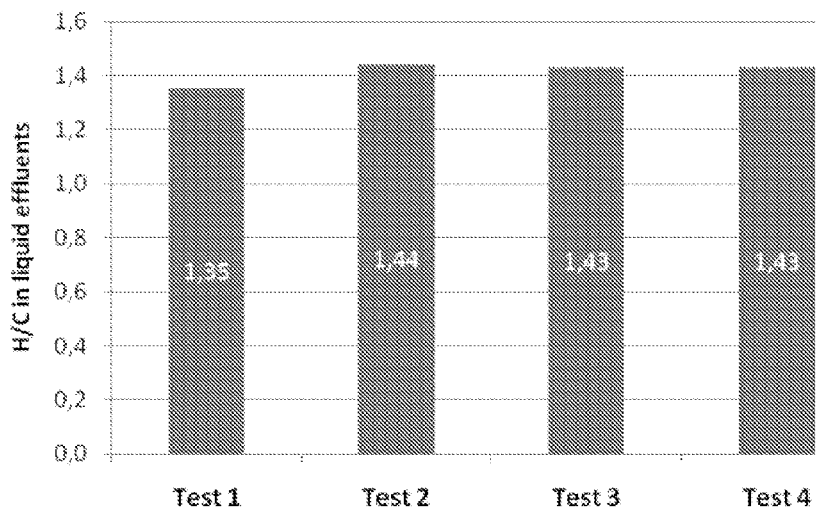
FIG. 3 represents the atomic H/C ratio in liquid in the 500+ fraction for the different tests of example 1 (reaction time: 1 h; temperature: 430° C.).
Figure 4:
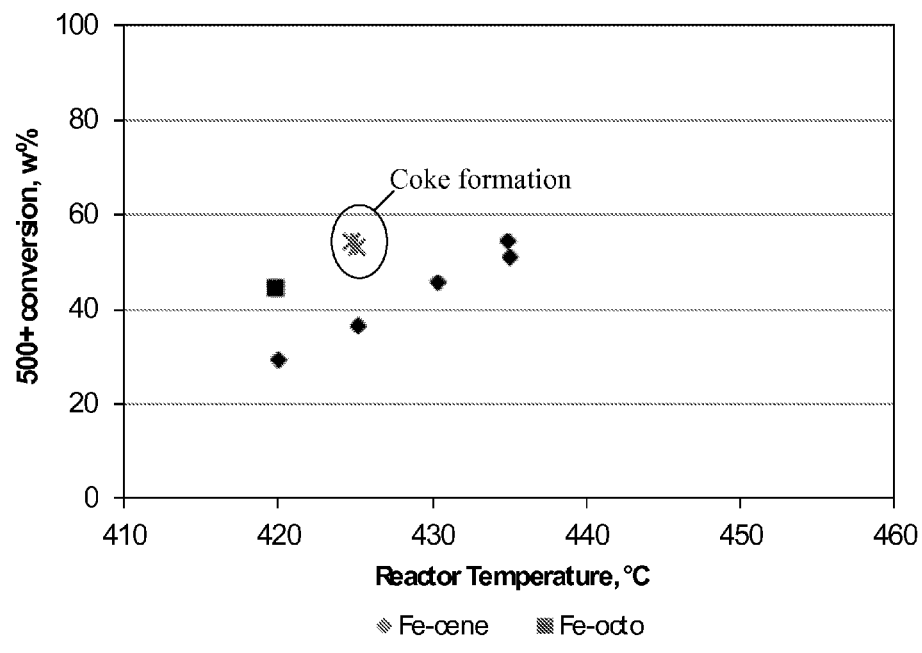

FIG. 4 represents the conversion of the 500$^+$ fraction as a function of the reactor temperature with two oil-soluble iron catalyst precursors: ferrocene (Fe-cene) and iron octoate (Fe-octo). Conditions tested (example 2): reaction time=1 h; catalyst concentration=5000 wppm metal. Crosses (x) indicate runs where coke formation occurred.

Figure 5:
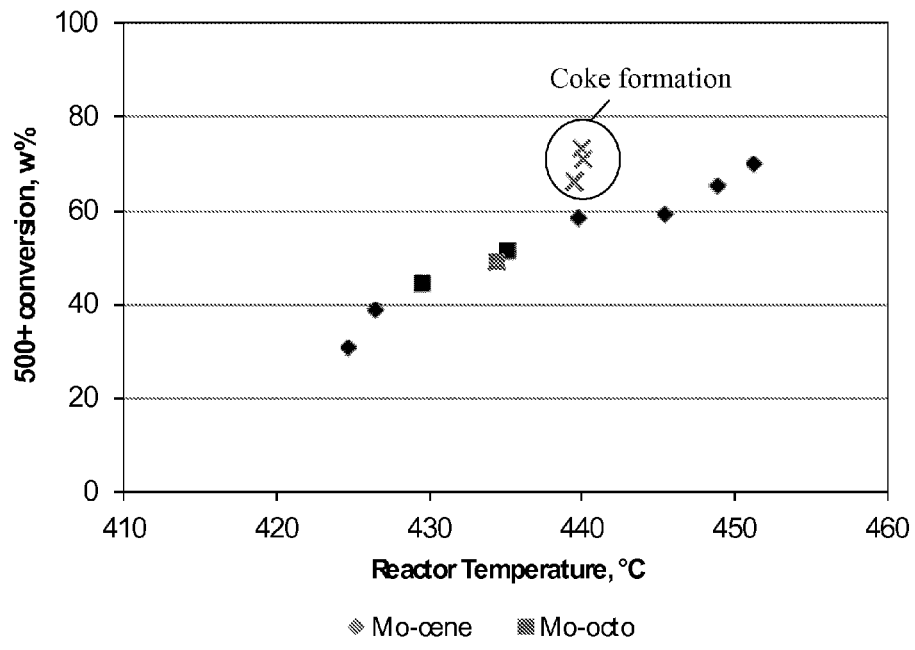

FIG. 5 represents the conversion of the 500$^+$ fraction as a function of the reactor temperature with two oil-soluble molybdenum catalyst precursors: molybdenocene (Mo-cene) and molybdenum octoate (Mo-octo). Conditions tested (example 3): reaction time=1 h; catalyst concentration=5000 wppm metal. Crosses (x) indicate runs where coke formation occurred.

The represented unit comprises two preparation reactors 10, 20 for catalyst preparation from catalyst precursor.

Each preparation reactor 10, 20 is dedicated to the preparation of a specific catalyst, intended for hydroconversion (reactor 10) or for hydrotreatment (reactor 20).

Each preparation reactor 10, 20 is fed with a catalyst precursor 13, 23 respectively which can be in several forms: water soluble, oil soluble or finely powdered solid.

For activation of the catalyst precursor 13, 23 in each of preparation reactor, a sulfiding agent 15, 25 may be added (DMDS, $H_2S$, elemental sulfur) as represented on the figure.

Hydrogen $H_2$ 12, 22, may also be added in the preparation reactors 10, 20, respectively.

Each preparation reactor 10, 20 may also be fed with the feedstock 11, 21 to treat. In that case, the sulfur contained in the feedstock may be used for activation of the catalyst.

Alternatively, instead of the feedstock to treat, a liquid hydrocarbon may be used, for example as solvent, and fed to the preparation reactors 10, 20.

In order to improve catalyst precursor dispersion inside each preparation reactor, crushed solids or other additives 14, 24 can be added (such as crushed coke, 2% wt, granulometry 300 to 500 microns).

The unit also comprises a hydroconversion reactor 40, a hydrotreatment reactor 50 and a separation section 60.

A pre-heater 30 is placed upstream of the hydroconversion reactor 40 for heating the feedstock to treat.

A slurry 31, issued from preparation reactor 10 and consisting of the activated hydroconversion catalyst, along with feedstock to treat and/or other hydrocarbonaceous feedstock and eventually other additives, is conducted to the pre-heater 30.

The feedstock to treat may also be fed partly or totally to the pre-heater via line 32. The heated slurry 41 is then fed to the hydroconversion reactor 40. Supplementary hydrogen 42 may also be added upstream from reactor 40.

To the effluents 51 exiting hydroconversion reactor 40, is added the hydrotreatment catalyst 26 prepared in preparation reactor 20, upstream from hydrotreatment reactor 50. Hydrogen 52 may also be added, upstream from hydrotreatment reactor 50.

The effluents 56 exiting hydrotreatment reactor 50 are separated in separation section 60. This separation section may for example comprise a flash vessel for gas removing, an atmospheric fractionation and a vacuum fractionation.

EXAMPLES

Hydroconversion and hydrotreatment of a vacuum residue have been performed. The tested vacuum residue presents the following characteristics:

TABLE 11 characteristics of vacuum residue tested
(Arab Heavy Vacuum residue)

| Characteristic | Value |
| --- | --- |
| API | 3 |
| Density at 15° C. (g/ml) | 1.0581 |
| Sulfur (w %) | 5.58 |
| Nitrogen (w %) | 0.54 |
| MCRT ASTM D4530 (w %) | 25.0 |
| Asphalthenes (C7 insol.), w % | 19.7 |

TABLE 11-continued characteristics of vacuum residue tested
(Arab Heavy Vacuum residue)

| Characteristic | Value |
| --- | --- |
| C, w % | 84.2 |
| H, w % | 9.9 |
| H/C, atomic ratio | 1.41 |
| Ni, ppm | 70 |
| V, ppm | 215 |
| Cut points from ASTM D7169 | |
| IBP-200° C. fraction (w %) | 0.0 |
| 200-350° C. fraction (w %) | 0.0 |
| 350-500° C. fraction (w %) | 3.10 |
| 500-FBP fraction (w %) | 96.9 |

MCRT: Micro Carbon Residue Test

All tests have been performed in a 500 ml stirred batch reactor with continuous hydrogen feeding at constant pressure. The operating conditions are total pressure at 15 MPa, temperature between 420 and 450° C., $H_2$ flow set at 100 NL/h and stirring speed of 900 rpm.

The vacuum residue is pre-heated to reduce its viscosity and allow its transfer to the reactor. Catalyst precursors (molybdenum octoate, nickel octoate, iron octoate, ferrocene and/or molybdenocene) and liquid DMDS are added to the pre-heated vacuum residue in the reactor which is then closed. Hydrogen is then added and temperature increased with two stages at 250° C. and 320° C. for 10 minutes each. Then the reactor temperature is raised rapidly to the operating value.

At the end of the test, the reactor is cooled down and depressurized. All gaseous and liquid effluents are collected, weighed and analysed.

The gases are analysed on-line by gas chromatography (Agilent G2891 micro Gas Chromatograph) and the reaction products are analysed by high temperature gas chromatography (ASTM D7169) for determining the yields.

Example 1

In this test series, the total catalytic metal (molar) content is kept constant but the Ni/Mo ratio is varied between 0 and 0.5. For this test series, the operating temperature is fixed to 430° C. during one hour.

TABLE 12 concentration of catalytic metals in the different tests
(wppm, based on the weight of the feedstock)

| | Test | | | |
| --- | --- | --- | --- | --- |
| | 01 | 02 | 03 | 04 |
| ratio Ni/Mo (mol/mol) | 0 | 0.1 | 0.3 | 0.5 |
| Catalyst Mo (wppm) | 500 | 454 | 384 | 333 |
| Catalyst Ni (wppm) | 0 | 28 | 71 | 102 |

For this test series, both molybdenum and nickel are added separately to the feedstock as octoate, which are both in the liquid state at ambient conditions.

Molybdenum octoate has supposedly the following formula: $C_{32}H_{60}MoO_8$. Nickel octoate has the following formula $C_{16}H_{30}NiO_4$.

300 mL of feedstock and the appropriate amount of molybdenum and nickel based catalyst precursors are fed into the reactor (see Table 12). 260 mol % of sulphur (compared to the amount of catalytic metals, molybdenum and nickel) as DMDS is also fed into the reactor as sulphiding agent. The reactor is pressurized with hydrogen and heated to the desired temperature 430° C. at a heating rate of 5° C./min.

Compositions of the products obtained are presented in table 13.

For all the tests, no coke formation was observed.

These results show that the appropriate choice of catalysts permits to enhance the quality of hydroconversion products (more hydrodesulfurisation particularly and higher hydrogen content in the bottom fraction) without modification of the operating conditions or conversion rate and without important modification in the ratios of the conversion products.

The results also show that due the conversion of 500+ cut, the concentration of metals (Mo, Ni, V) in the remaining 500+ increases compared to the original mixture of feed and catalytic metals.

TABLE 13 tests results

|  | Test | | | |
|---|---|---|---|---|
|  | 1 | 2 | 3 | 4 |
| Conversion (+/−3%) | 42.1 | 41.6 | 42.1 | 43.3 |
| Density (15° C.) | 1.009 | 0.992 | 1.007 | 1.006 |
| API | 9 | 10 | 9 | 9 |
| Liquid effluents | | | | |
| Naphtha (C$_5$-200° C.) (wt %) (*) | 6.56 | 6.30 | 6.55 | 6.59 |
| Gas oil (200-350° C.) (wt %) (*) | 14.51 | 14.34 | 14.21 | 14.59 |
| Vacuum Gas oil (350-500° C.) (wt %) (*) | 21.37 | 20.84 | 21.61 | 21.62 |
| Residue (500+ ° C.) (wt %) (*) | 56.30 | 56.12 | 56.64 | 55.68 |
| S (weight %) | 4.90 | 4.00 | 3.90 | 4.00 |
| N (weight %) | 0.60 | 0.59 | 0.57 | 0.58 |
| H/C | 1.35 | 1.44 | 1.43 | 1.43 |
| Gaseous effluents | | | | |
| C$_1$-C$_2$ (wt %) | 1.45 | 1.50 | 1.38 | 1.32 |
| C$_3$-C$_4$ (wt %) | 1.07 | 1.37 | 1.11 | 1.03 |
| H$_2$ consumption wt % | −2.60 | −2.15 | −3.07 | −2.23 |
| H$_2$S yield (wt %) | 1.35 | 1.69 | 1.56 | 1.40 |
| 500+ fraction of liquid effluents (*) | | | | |
| Ni + V + Mo (ppm) | 1356 | 1313 | 1278 | 1270 |

(*) the range corresponds to the distillation range.

Example 2

Ferrocene

Test series have been performed to compare ferrocene and iron octoate as precursors of an active catalytic phase for the hydroconversion of a vacuum residue.

Ferrocene has the following formula: Cp$_2$Fe (or (C$_5$H$_5$)$_2$Fe).

Iron octoate has the following formula: C$_{24}$H$_{45}$FeO$_6$

The same vacuum residue as in the previous examples was used as feed. Its composition is presented in table 11.

The different tests of a series have been performed at increasing temperature in the 420-450° C. range.

300 mL of feedstock and iron based catalyst precursor are fed into the reactor. For each catalyst precursor, 5000 wppm of Fe as Cp$_2$Fe or as Fe-octoate, is added to the feedstock (wppm: based on the weight of the feedstock). 130 mol % of sulphur (compared to iron) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

The results are presented in FIG. 4. In this graph conversions are plotted against temperature. The runs in which coke formation occurred are represented by crosses.

With iron octoate as precursor, coke formation occurred at 425° C. The maximum 500+ conversion without coke formation was observed at 420° C., and was of 45 w %.

With ferrocene as precursor, temperature could be raised to 435° C. without coke formation. The 500+ conversion observed at this temperature was of 57 w %.

This example series shows the potential of metallocenes as precursors for obtaining high hydrogenation activity catalysts for heavy feedstocks hydroconversion.

Example 3

Molybdenocene

Tests have been performed to compare bis(cyclopentadienyl)molybdenum dichloride and Mo-octoate as precursors of an active catalytic phase for the hydroconversion of a vacuum residue.

bis(cyclopentadienyl)molybdenum dichloride has the following formula: Cp$_2$MoCl$_2$ (or (C$_5$H$_5$)$_2$MoCl$_2$).

Molybdenum octoate has supposedly the following formula: C$_{32}$H$_{60}$MoO$_8$ The same vacuum residue as in the previous examples was used as feed. Its composition is presented in table 11.

The different tests of a series have been performed at increasing temperature in the 420-450° C. range.

300 mL of feedstock and molybdenum based catalyst precursor are fed into the reactor. For each catalyst precursor, 500 wppm of Mo as Cp$_2$MoCl$_2$ or as Mo-octoate, is added to the feedstock (wppm: based on the weight of the feedstock). 260 mol % of sulphur (compared to molybdenum) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

The results are presented in FIG. 5. In this graph conversions are plotted against temperature. The runs in which coke formation occurred are represented by crosses.

With molybdenum octoate as precursor, coke formation occurred at 440° C. The maximum 500+ conversion without coke formation was observed at 435° C., and was of 52 w %.

With bis(cyclopentadienyl)molybdenum dichloride as precursor, temperature could be raised to 450° C. without coke formation. The 500+ conversion observed at this temperature was of 70 w %.

The use of a molybdenocene allows applying higher temperatures than the use of Mo-octoate, thus leading to deeper conversions together with the absence of coke formation.

Example 4

Blank Test

The same test has been performed without any catalyst and with a blend of atmospheric residue. The composition of this feedstock is given in table 14. The hydrogen flow was set at 0 Nl/h. The feedstock was processed during 30 min at a temperature of 420.5° C. An important amount of coke was produced, which illustrates the effect of catalyst for suppression of coke.

TABLE 14 characteristics of vacuum residue tested (Arab Heavy Vacuum residue)

| Characteristic | Value |
|---|---|
| API | |
| Density at 15° C. (g/ml) | 0.9671 |
| Sulfur (w %) | 3.13 |
| Nitrogen (w %) | 0.25 |
| MCRT ASTM D4530 (w %) | 8.3 |
| Asphalthenes (C7 insol.), w % | 2.9 |
| Ni, ppm | 20 |
| V, ppm | 50 |
| Cut points from ASTM D7169 | |
| IBP-200° C. fraction (w %) | 0.0 |
| 200-350° C. fraction (w %) | 5.1 |
| 350-500° C. fraction (w %) | 40.9 |
| 500-FBP fraction (w %) | 54.0 |

MCRT: Micro Carbon Residue Test

The invention claimed is:

1. A process for hydroprocessing of heavy hydrocarbonaceous feedstock in at least one hydroconversion reactor for hydroconversion of said heavy hydrocarbonaceous feedstocks and in at least one hydrotreatment reactor for hydrotreatment of said heavy hydrocarbonaceous feedstocks, said process comprising the preparation of two or more catalysts, each catalyst being prepared from one or more catalyst precursors in at least one specific preparation reactor, each preparation reactor feeding one or more hydroconversion or hydrotreatment reactors, and each catalyst contained in a preparation reactor being individually dedicated to hydroconversion or hydrotreatment of said feedstock, and wherein said catalyst(s) dedicated to hydroconversion reactor contain at least one transition metal selected from group VB, VIB, VIII, in an active state, and said catalyst(s) dedicated to hydroconversion is prepared from a precursor which is an organometallic coordination compound of formula $(C_1C_2ML_n)$ (I), where M is a transition metal selected from group IIA, IIIB, IVB, VB, VIB, VIIB, VIII, IB or IIB of the periodic table of elements, —$C_1$ and —$C_2$ are monocyclic or polycyclic aryl hydrocarbon ligands that are pi-bonded to M, —$C_1$ and —$C_2$ being the same or different, each of —$C_1$ or —$C_2$ comprising from 0 to 5 substituents R, each substituent R being the same or different, R being selected from:

a C3-C8 substituted or unsubstituted monocyclic or polycyclic ring structure that is partially unsaturated unsaturated or aromatic, fused or not fused to the ligand —$C_1$ or —$C_2$, a C3-C8 substituted or unsubstituted, partially unsaturated or unsaturated, linear or branched, alicyclic hydrocarbyl radical, a C1-C8, substituted or unsubstituted, linear or branched, saturated hydrocarbyl radical, —$C_1$ and —$C_2$ being independent or connected via at least one substituent R, -L is a ligand that is sigma-bonded to M, n is an integer equal to 0 to 3, each -L is, independently, a univalent ligand.

2. The process according to claim 1, wherein each preparation reactor is fed with a part of the feedstock to upgrade.

3. The process according to claim 1, wherein each preparation reactor is fed with a sulfiding agent.

4. The process according to claim 1, wherein each preparation reactor is fed with hydrogen.

5. The process according to claim 1, wherein each preparation reactor is fed with a dispersant agent.

6. The process according to claim 1, wherein each dedicated catalyst is prepared in at least two preparation reactors.

7. The process according to claim 1, wherein said catalyst(s) dedicated to hydrotreatment contain two transition metals in an active state, one transition metal being selected from group VB, VIB, VIII and another transition metal being selected from group VIII.

8. The process according to claim 7, wherein said catalyst(s) dedicated to hydrotreatment contain Mo and Ni, or Mo and V, or Fe and Ni.

9. The process according to claim 1, wherein said catalyst(s) dedicated to hydroconversion contain V, Mo or Fe.

10. The process according to claim 1, wherein said catalyst(s) dedicated to hydroconversion contain from 20 ppm to 700 ppm of transition metal.

11. The process according to claim 10, wherein said catalyst(s) dedicated to hydroconversion contain from 250 ppm to 650 ppm of transition metal.

12. The process according to claim 11, wherein said catalyst(s) dedicated to hydroconversion contain from 300 ppm to 600 ppm of transition metal.

13. The process according to claim 1, wherein the whole content of transition metals in said catalyst(s) dedicated to hydrotreatment ranges from 200 to 1000 ppm.

14. The process according to claim 13, wherein the whole content of transition metals in said catalyst(s) dedicated to hydrotreatment ranges from 250 to 900 ppm.

15. The process according to claim 14, wherein the whole content of transition metals in said catalyst(s) dedicated to hydrotreatment ranges from 300 to 500 ppm.

16. The process according to claim 1, wherein said catalyst precursors for said catalyst(s) dedicated to hydrotreating are selected from naphtenates, octoates, oxides.

17. The process according to claim 1, wherein the organometallic coordination compound is a metallocene compound presenting the general formula (II) below

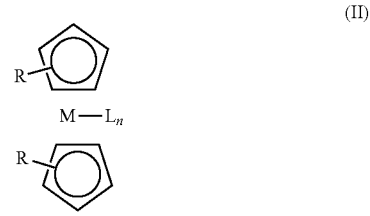

(II)

wherein the R substituted or unsubstituted cyclopentadienyl ligands are pi-bonded to M, and L ligands are sigma-bonded to M, and where M, L, R and n are defined as in formula (I).

18. The process according to claim 1, wherein -L is selected from Hydride (-L =—H), Halide (-L =—F, —Cl, —Br, —I), cyanide (-L =—CN), Alkoxide (-L =—OR), Thiolate (-L =—SR), Amide (-L =—$NR_2$), Phosphide (-L = —$PR_2$), Alkyl (-L =—$CH_2R$ or other), Alkenyl (-L = —CHCHR), Alkynyl (-L =—CCR), Acyl (-L =—COR), Isocyanide (-L =—CNR), Nitrosyl (-L =—NO), Diazenide (-L = —NNR), Imide (-L =═NR), L =-$ER_3$ or -$EX_3$ (with E = Si, Ge, Sn), -L=—$PR_3$,—$PX_3$,-$AsR_3$,—$SbR_3$, amines, L=$ER_2$ (with E=O, S, Se, Te), where X is an halogen atom and R is a C1-C8, preferably a C1-C6, linear or branched, alkyl, alkenyl Group or a C3-C8 alicyclic or aromatic group.

19. The process according to claim 1 wherein M in said catalyst(s) dedicated to hydrotreating are selected from Group IIA, IIB, IIIB, IVB, VB, VIB, VIIB or VIII of the periodic table of the elements.

20. The process according to claim 1, wherein said carbonaceous feedstocks comprise an atomic H/C ratio of at least 0.25.

\* \* \* \* \*